United States Patent [19]
Redman

[11] Patent Number: 5,716,073
[45] Date of Patent: Feb. 10, 1998

[54] TWO PIECE FABRIC-RETAINING SEAT BELT BEZEL

[75] Inventor: Scott D. Redman, Royal Oak, Mich.

[73] Assignee: Chrysler Corporation, Auburn Hills, Mich.

[21] Appl. No.: 674,946

[22] Filed: Jul. 3, 1996

[51] Int. Cl.⁶ .................................................. B60R 21/00
[52] U.S. Cl. ........................ 280/801.1; 280/808; 297/483
[58] Field of Search ............................. 280/801.1, 808, 280/807; 297/468, 483, 482, 486

[56] References Cited

U.S. PATENT DOCUMENTS

| | | | |
|---|---|---|---|
| 3,869,097 | 3/1975 | Peel et al. | 242/107 |
| 3,915,495 | 10/1975 | Oehm | 297/388 |
| 4,142,274 | 3/1979 | Scholz et al. | 24/163 R |
| 4,529,249 | 7/1985 | Ino | 297/474 |
| 4,568,106 | 2/1986 | Yokoyama | 280/807 |
| 5,022,677 | 6/1991 | Barbiero | 280/801 |
| 5,123,673 | 6/1992 | Tame | 280/801.1 |
| 5,364,170 | 11/1994 | West | 297/483 |
| 5,372,382 | 12/1994 | Whitens | 280/808 |
| 5,390,982 | 2/1995 | Johnson et al. | 297/410 |
| 5,397,152 | 3/1995 | Kawamura | 280/807 |
| 5,544,917 | 8/1996 | Loxton et al. | 280/808 X |
| 5,556,171 | 9/1996 | Busch | 297/483 |

Primary Examiner—Christopher P. Ellis

[57] ABSTRACT

A seat belt bezel includes an inner bezel element that includes six hollow insert tabs. Each tab is snappingly engageable with a respective receptacle in a seat belt retractor housing that is positioned in a seat of a vehicle. An outer bezel member in turn includes six engagement legs, with each engagement leg of the outer bezel element being snappingly engaged with an insert tab of the inner bezel element to expand the insert tabs in the receptacles of the retractor housing. Part of the seat fabric is sandwiched between the inner bezel element and outer bezel element to retain the fabric.

17 Claims, 1 Drawing Sheet

U.S. Patent
Feb. 10, 1998
5,716,073
FIG. 1
FIG. 3
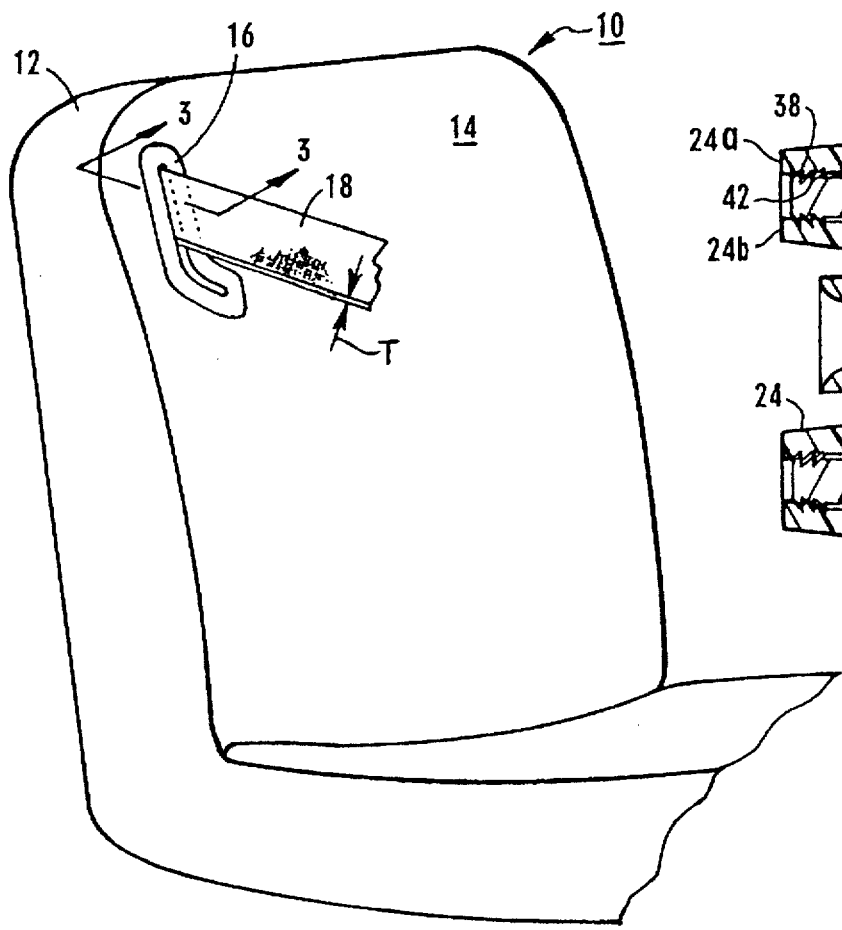
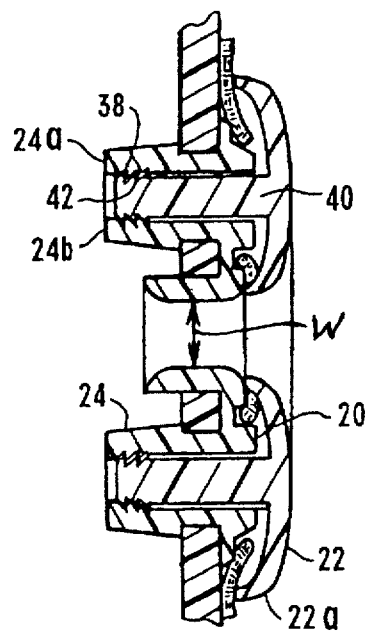
FIG. 2
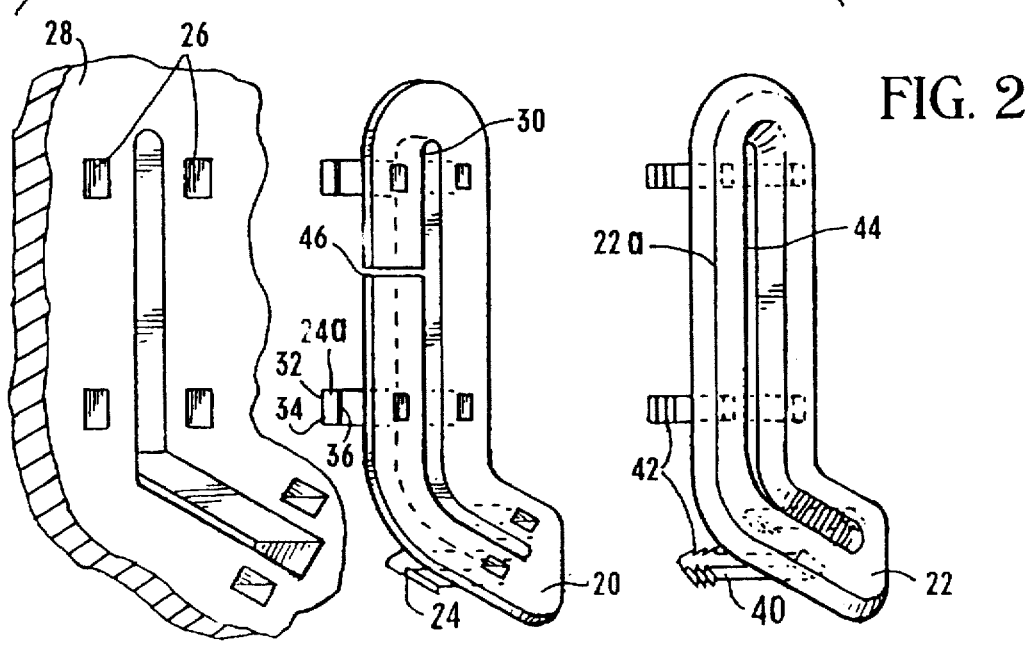

TWO PIECE FABRIC-RETAINING SEAT BELT BEZEL

BACKGROUND OF THE INVENTION

1. Field of the Invention

The present invention relates generally to vehicle seat belts, and more particularly to seat belt bezels that are associated with seat belt retractor systems that are mounted in vehicle seats.

2. Description of the Related Art

In many vehicle seats, the retractor of the shoulder belt is disposed in the seat itself, with the seat belt extending through an opening near the top of the seat. Such designs are particularly common in convertibles, because supporting the belt system in the seat of a convertible is often the only practical way to mount the system.

In seat belt systems that are integrated into the seat, a hole must be cut in the seat fabric adjacent the seat belt retractor housing to permit the seat belt to extend therethrough. For both cosmetic and functional reasons, the hole in the fabric is typically covered by a slotted bezel that is engaged with the retractor housing, with the seat belt extending through the slot of the bezel.

Unfortunately, it happens that conventional bezels can become dislodged from the retractor housings to which they are attached. Furthermore, the seat fabric often is not adequately retained by the bezel. Consequently, the fabric can be pulled away from the bezel and/or fray, which is unsightly. As recognized by the present invention, however, it is possible to provide a seat belt bezel which retains the seat fabric and which is firmly engaged with a retractor housing in a seat.

Accordingly, it is an object of the present invention to provide a bezel for a seat-integrated seat belt system. Another object of the present invention is to provide a bezel for a seat-integrated seat belt system which firmly engages to a retractor housing. Still another object of the present invention is to provide a bezel for a seat-integrated seat belt system which retains the fabric of the seat. Yet another object of the present invention is to provide a bezel for a seat-integrated seat belt system which is easy to use and cost-effective.

SUMMARY OF THE INVENTION

The details of the present invention, both as to its structure and operation, can best be understood in reference to the accompanying drawings, in which like reference numerals refer to like parts, and in which:

DESCRIPTION OF THE DRAWINGS

FIG. 1 is a perspective view of the two-piece bezel of the present invention, shown engaged with a seat to cover a seat belt opening of the seat;

FIG. 2 is a an exploded perspective view of the bezel; and

FIG. 3 is a cross-sectional view as seen along the line 3—3 in FIG. 1.

DETAILED DESCRIPTION OF THE INVENTION

Referring initially to FIG. 1, a vehicle is shown, generally designated 10, which includes a seat 12 covered by fabric 14. It is to be understood that the fabric 14 can be leather, cloth, imitation leather, or other suitable seat-covering fabric.

The fabric 14 is formed with an opening (not shown in FIG. 1) that is covered by a two-piece bezel 16. In turn, the bezel 16 slidably receives a seat belt 18 therethrough. As more fully disclosed below, the seat belt 18 is operably engaged with a seat belt retractor housing that is disposed in the seat 12.

Referring to FIGS. 2 and 3, the bezel 16 includes an inner bezel element 20 and an outer bezel element 22. As shown, the inner bezel element 20 includes a plurality of, preferably six, hollow insert tabs 24, with each tab 24 being snappingly engageable with a respective hole or receptacle 26 in an otherwise conventional seat belt retractor housing 28 that is mounted by well-known means in the seat 12. Per the present invention, the inner bezel element 20 is formed with an inner slot 30 that slidably guides the seat belt 18 therethrough. Advantageously, the inner bezel element 20 is made of a material characterized by a low coefficient of friction, such as Teflon®, for promoting movement of the seat belt 18 through the inner slot 30. Preferably, the width "W" of the inner slot 30 (FIG. 3) is approximately equal to the thickness "T" of the seat belt 18 (FIG. 1), to inhibit twisting of the seat belt 18 as it passes through the slot 30.

To facilitate snapping engagement of the inner bezel element 20 with the retractor housing 28, each insert tab 24 includes two opposed tab arms 24a, 24b. Each tab arm 24a,b in turn includes a respective end surface 32 and a respective ramp surface 34 that extends from the end surface 32 and that is configured such that the ramp surface 34 radially diverges from the end surface 32. As shown best in FIG. 2, each ramp surface 34 terminates at a respective annular abutment wall 36 that is spaced from and oriented generally parallel to the respective end surface 32.

With the above disclosure in mind, it may now be appreciated that each insert tab 24 is materially biased to an engaged configuration, wherein the tab arms 24a, 24b are spaced from each other. Also, each insert tab 24 is movable to an insert configuration, wherein the tab arms 24a, 24b are urged toward each other.

Accordingly, the inner bezel element 20 can be advanced toward the retractor housing such that the insert tabs 24 are advanced into respective holes or receptacle 26 of the housing. As the insert tabs are advanced into the holes 26, each ramp surface 34 rides against the wall of the respective hole 26, urging the insert tab to the insert configuration. When the abutment wall 36 of the insert tab clears the wall of the respective hole 26, the insert tab 24 snappingly assumes the engaged configuration to lock the insert tab 24 into engagement with the hole 26. In addition to the structure described above, as best shown in FIG. 3 each insert tab 24 internally is formed with annular inwardly-projecting tab ribs 38 for purposes to be shortly disclosed.

Still cross-referring to FIGS. 2 and 3, the outer bezel element 22 includes a plurality of engagement legs 40. In accordance with the present invention, each engagement leg 40 is advanceable into a respective insert tab 24 to attach the outer bezel element 22 to the inner bezel element 20. As envisioned by the present invention, a portion of the fabric 14 of the seat 12 is clamped between the bezel elements 20, 22, with the legs 40 extending through the fabric 14. Thus, the fabric 14 is held in place by the legs 40 and by being clamped between the bezel elements 20, 22. To further hold the fabric 14 between the bezel elements 20, 22, the surface 22a of the outer bezel element 22 is gently curved in the transverse dimension toward the inner bezel element 20, as shown in FIG. 3.

FIG. 3 best shows that each engagement leg 40 is externally formed with leg ribs 42. As shown in FIG. 3, the leg ribs 42 cooperate with the tab ribs 38 of the respective insert tab 24 to hold the leg 40 in the respective tab 24. Additionally, the skilled artisan will recognize that each engagement leg 40 holds the respective insert tab 24 in the engaged configuration when the leg 40 is advanced into the tab 24, thereby inhibiting disengagement of the inner bezel element 20 from the retractor housing 28.

To provide a means for the seat belt 18 to extend through the outer bezel element 22, the outer bezel element 22 is formed with a longitudinal outer slot 44 through which the seat belt 18 extends. Furthermore, to provide a means for engaging the seat belt 18 with the bezel 16 without disassembling the seat 12, the inner bezel element 20 can be formed with an install channel 46 that is oriented generally perpendicularly to the inner slot 30. With this structure, the seat belt 18 can be advanced through the install channel 46 into the inner slot 30.

While the particular TWO PIECE FABRIC-RETAINING SEAT BELT BEZEL as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A bezel engageable with a retractor housing of a seat belt, the housing being formed with a plurality of receptacles and being disposed in a vehicle seat having fabric, the bezel comprising:

an inner bezel element including a plurality of hollow insert tabs, each tab being snappingly engageable with a respective hole in the retractor housing, the inner bezel element being formed with an inner slot for slidably guiding the seat belt therethrough; and an outer bezel element including a plurality of engagement legs, each engagement leg being advanceable into a respective insert tab to attach the outer bezel element to the inner bezel element with a portion of the fabric of the seat held therebetween.

2. The bezel of claim 1, wherein the outer bezel element is formed with an outer slot through which the seat belt extends.

3. The bezel of claim 2, wherein each insert tab includes:
   an end surface; and
   a frusto-conical ramp surface extending from the end surface and terminating at an annular abutment wall, each insert tab being biased to an engaged configuration and movable to an insert configuration, each engagement leg holding the respective insert tab in the engaged configuration when the leg is advanced into the tab.

4. The bezel of claim 3, wherein each abutment wall is oriented parallel to the respective end surface.

5. The bezel of claim 4, wherein each insert tab internally is formed with tab ribs and each engagement leg externally is formed with leg ribs, and the leg ribs cooperate with the tab ribs to hold the leg in the respective tab.

6. The bezel of claim 5, wherein the inner bezel element is made of a material characterized by a low coefficient of friction.

7. The bezel of claim 3, wherein the inner bezel element is formed with an install channel oriented generally perpendicularly to the inner slot for permitting the seat belt to be advanced through the install channel into the inner slot.

8. A vehicle, comprising:
   a seat;
   a seat belt retractor housing disposed in the seat;
   a seat belt operably engaged with the seat belt retractor housing;
   fabric covering the seat and formed with an opening through which the seat belt extends; and
   a two-piece bezel attached to the housing for covering the hole and holding a part of the fabric, wherein the retractor housing is formed with a plurality of holes, and the bezel comprises:

an inner bezel element including a plurality of hollow insert tabs, each tab being snappingly engageable with a respective hole in the retractor housing, the inner bezel element being formed with an inner slot for slidably guiding the seat belt therethrough, the inner bezel element being made of a material characterized by a low coefficient of friction; and an outer bezel element including a plurality of engagement legs, each engagement leg being advanceable into a respective insert tab to attach the outer bezel element to the inner bezel element with a portion of the fabric of the seat held therebetween.

9. The vehicle of claim 8, wherein the outer bezel element is formed with an outer slot through which the seat belt extends, and wherein each insert tab includes:
   an end surface; and
   a frusto-conical ramp surface extending from the end surface and terminating at an annular abutment wall oriented parallel to the respective end surface, each insert tab being biased to an engaged configuration and movable to an insert configuration, each engagement leg holding the respective insert tab in the engaged configuration when the leg is advanced into the tab.

10. The vehicle of claim 9, wherein each insert tab internally is formed with tab ribs and each engagement leg externally is formed with leg ribs, and the leg ribs cooperate with the tab ribs to hold the leg in the respective tab, and wherein the inner bezel element is formed with an install channel oriented generally perpendicularly to the inner slot for permitting the seat belt to be advanced through the install channel into the inner slot.

11. In a vehicle including a seat covered with fabric and a seat belt retractor housing disposed in the seat with a seat belt engaged with the retractor housing and extending through an opening in the fabric, a two-piece bezel attached to the retractor housing and Covering the opening, the bezel receiving the seat belt and holding the fabric, said bezel comprising:

an inner bezel element including a plurality of hollow insert tabs, each tab being snappingly engageable with a respective hole formed in the retractor housing, the inner bezel element being formed with an inner slot for slidably guiding the seat belt therethrough; and an outer bezel element including a plurality of engagement legs, each engagement leg being advanceable into a respective insert tab to attach the outer bezel element to the inner bezel element with a portion of the fabric of the seat held therebetween.

12. The bezel of claim 11, wherein the outer bezel element is formed with an outer slot through which the seat belt extends.

13. The bezel of claim 11, wherein each insert tab includes:

an end surface; and a frusto-conical ramp surface extending from the end surface and terminating at an annular abutment wall, each insert tab being biased to an engaged configuration and movable to an insert configuration, each engagement leg holding the respective insert tab in the engaged configuration when the leg is advanced into the tab.

14. The bezel of claim 13, wherein each abutment wall is oriented parallel to the respective end surface.

15. The bezel of claim 11, wherein each insert tab internally is formed with tab ribs and each engagement leg externally is formed with leg ribs, and the leg ribs cooperate with the tab ribs to hold the leg in the respective tab.

16. The bezel of claim 11, wherein the inner bezel element is made of a material characterized by a low coefficient of friction.

17. The bezel of claim 11, wherein the inner bezel element is formed with an install channel oriented generally perpendicularly to the inner slot for permitting the seat belt to be advanced through the install channel into the inner slot.

* * * * *